Dec. 24, 1963   F. A. ANETSBERGER   3,115,236
DOUGH PIECE SEPARATOR

Original Filed Jan. 30, 1957   2 Sheets-Sheet 1

INVENTOR:
Frank A. Anetsberger
By Horton, Davis, Brewer
and Brugman, Attorneys

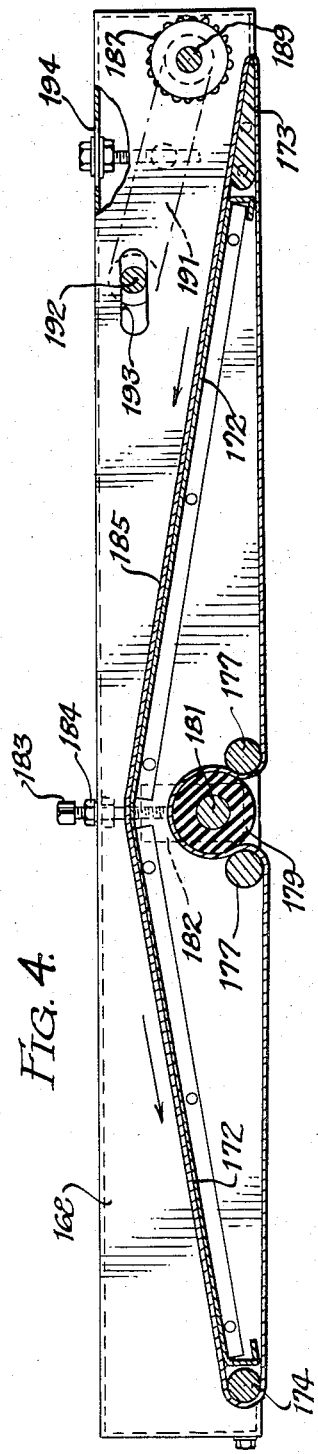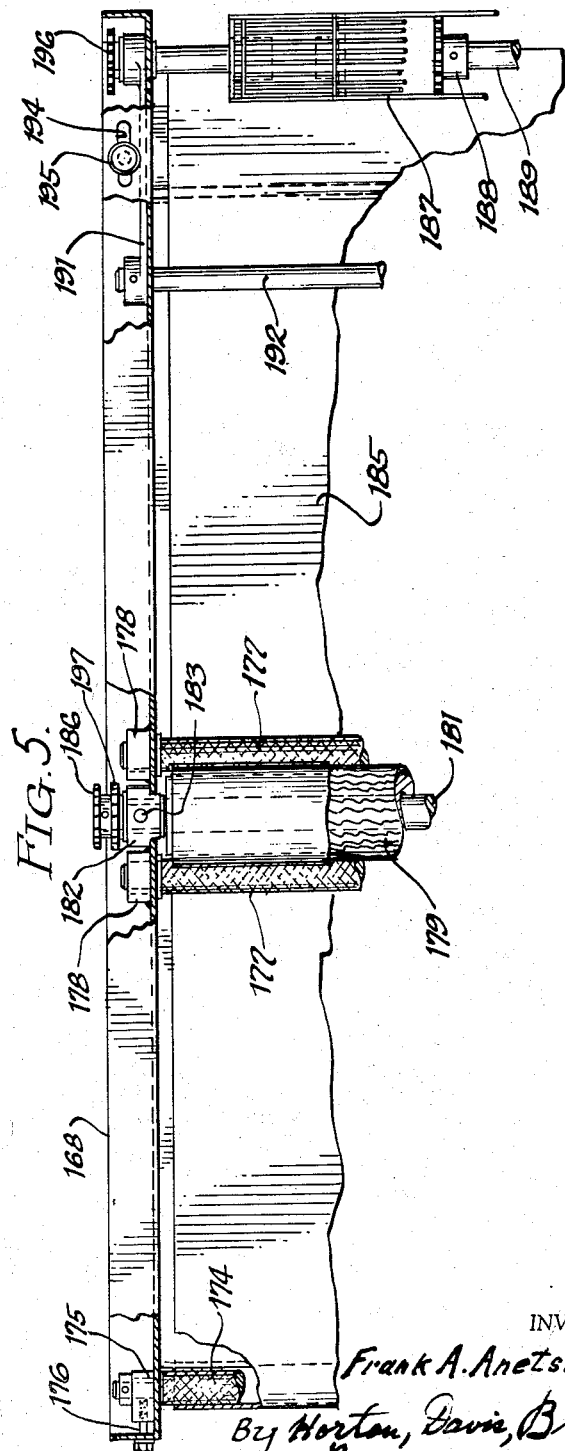

United States Patent Office 3,115,236
Patented Dec. 24, 1963

3,115,236
DOUGH PIECE SEPARATOR
Frank A. Anetsberger, Northbrook, Ill., assignor to Anetsberger Brothers, Inc., Northbrook, Ill., a corporation of Illinois
Original application Jan. 30, 1957, Ser. No. 637,170. Divided and this application Nov. 25, 1960, Ser. No. 71,484
9 Claims. (Cl. 198—34)

This invention relates in general to dough handling equipment, more particularly to dough piece separating mechanism, and is a division of the co-pending application Serial No. 637,170, filed January 30, 1957.

In that parent case completely automatic fried food production equipment is disclosed, specifically for use with dough piece make-up means having a conveyor for continuously delivering dough pieces in closely adjacent relative relationship, which includes a separateor for removing the dough pieces from the conveyor and spacing the same from each other, a continuous flow proofer through which the dough pieces so spaced from each other are passed, and a continuous flow fryer having a cooking trough and means for flowing cooking fat therethrough to float the dough pieces along while cooking them. It facilitates production, eliminates waste and maintains uniformity of the dough mix, if the dough pieces are made up or cut from a sheet of dough in closely adjacent or contiguous relationship to each other. But then they must be separated or spaced so that they will not interfere with each other because of their movements or expansion during subsequent handling or treatment, as in their travel through a proofer. Such separation or spacing of the dough pieces from each other in two directions, both in their direction of travel and laterally with respect thereto, is accomplished automatically by the novel separating mechanism herein disclosed and claimed.

Not only is this novel separator particularly useful in connection with the continuous flow apparatus noted hereinbefore, it also may be employed advantageously with other dough piece handling, treating or cooking equipment, such as for the purpose of placing dough pieces for butter buns, or the like, directly into baking pans, or for use in connection with packaging dough pieces, as in vertically stacking the same in a container.

A principal object of this invention therefore is to reduce the cost of forming and handling dough pieces and to insure uniformity and consistently high quality in such products. This object is attained in part by eliminating manual operations required in the use of prior equipment and partly by enabling maximum reduction in the quantity of scrap or trim which results during forming of the dough pieces.

Another object is to provide means for separating dough pieces, which are being carried by a first conveyor in closely adjacent relative relationship, so as to space the same from each other uniformly both in the direction of their travel on the conveyor and laterally with respect thereto. In the specific embodiment of the invention herein illustrated, this is accomplished by a conveyor means disposed above such first conveyor to remove and supportingly carry the dough pieces therefrom and including an endless belt having one reach in a plane parallel to that of the conveyor and means for driving that belt at a lineal speed greater than that of the first conveyor.

A further object of the invention is to facilitate spacing of the dough pieces laterally of their direction of travel on the first conveyor by providing means for supporting the conveyor means with the direction of travel thereof disposed angularly relative to that of the first conveyor. It is preferred that this supporting means and the means for driving the conveyor means be independently adjustable to facilitate accomplishment of another object, i.e., selection of any desired spacing within wide limits in either or both directions between adjacent dough pieces.

A further object is to insure proper removal of the dough pieces from the first conveyor, which is accomplished by providing feed means operable by the means for driving the conveyor means and mounted in closely spaced relationship relative to and above the belt of the conveyor means.

Another object of the invention is to insure against wear and strain of the belt of the conveyor means, while assuring proper operation of the separator, which results from the provision of guide means for the belt which includes a roller extending transversely of the belt to define a delivery end, a relatively thin plate over which the belt passes to define a receiving end, frame members for guiding the upper run of the belt, and drive rollers disposed below the frame members and engaging the lower run to drive the belt without undue strain upon the belt, delivery end roller or guide plate.

Numerous other objects and advantages of the invention will be apparent as it is better understood from the following description, which, when taken in connection with the accompanying drawings, discloses a preferred embodiment thereof.

In the drawings:

FIG 4 is a detail vertical section taken longitudinally through the upper conveyor portion of the separator; and FIG. 5 is a top plan view of a side portion of the mechanism of FIG. 4 with parts thereof broken away.

Figures 1, 2, 3:
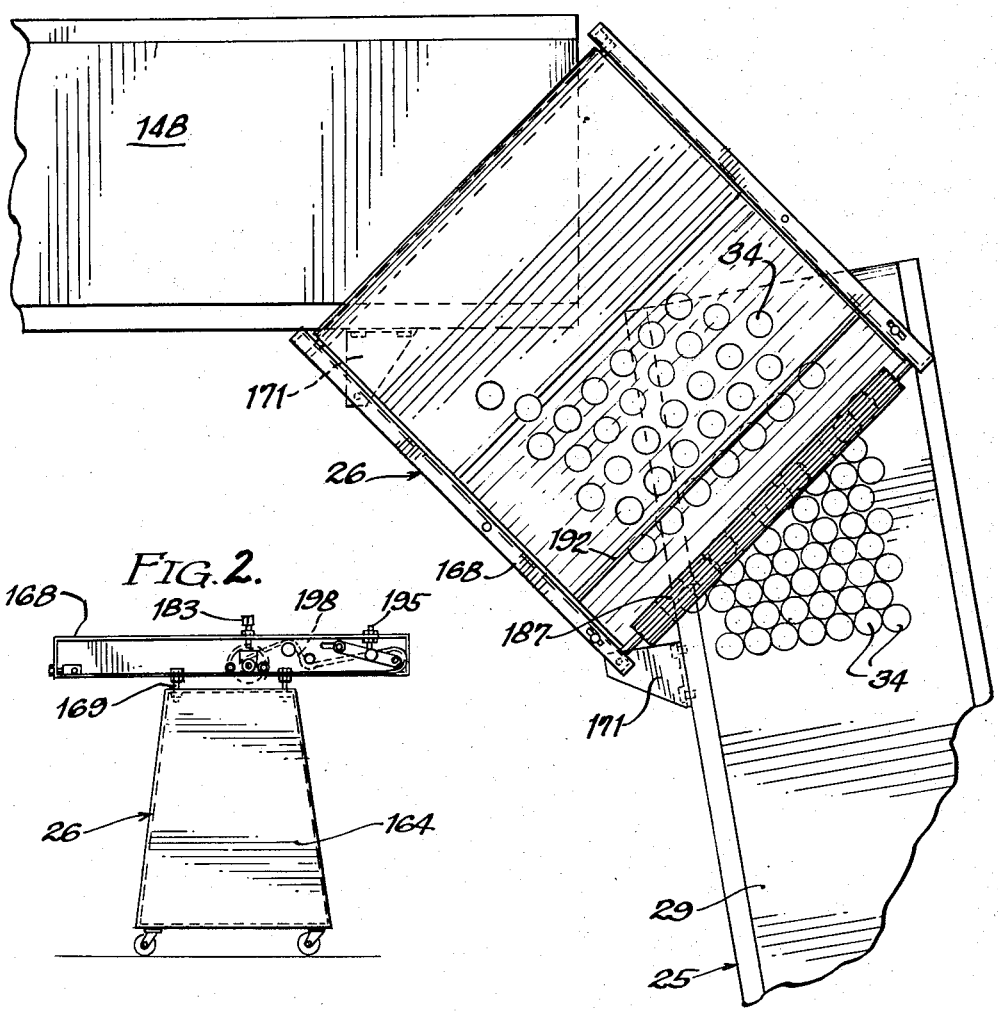
FIGURE 1 is a top plan view of an embodiment of the separator of this invention interposed between a dough piece delivering conveyor and a receiving conveyor.
FIG. 2 is a side elevation of the separator of FIG. 1.
FIG. 3 is an end elevation as seen from the righthand side of FIG. 2.

Referring more particularly to FIG. 1, a portion of a suitable dough piece make-up section, indicated generally by reference numeral 25, is shown as being operatively associated with a separator embodying this invention which is designated generally by reference numeral 26. The dough piece make-up section 25 may comprise any combination of well-known units for making up and delivering the desired dough pieces in closely adjacent relationship relative to each other, and includes an endless belt conveyor 29 having suitable means for driving it in the usual manner. In FIG. 1, this conveyor 29 is illustrated as delivering dough pieces 34 to the separator 26 with the longitudinal movement of the conveying run of the belt being upward from the bottom of the drawing. As seen therein, the dough pieces 34 are in contiguous relationship on the belt 29 both in their direction of travel and laterially with respect thereto. As previously explained, the purpose of the separator 26 is to space these dough pieces 34 from each other in both such directions and to deliver the spaced dough pieces to a receiving conveyor, or the like, shown herein as a belt conveyor 148. It will be understood, of course, that the separator 26 similarly may be employed to deliver the spaced dough pieces 34 to any other device or equipment, as hereinbefore noted.

The unit 26, as best seen in FIGS. 2 and 3, is mounted upon a wheeled carriage 164 having a driving motor 165 and a suitable variable speed reduction unit 166 housed therein for actuating a drive chain 167. A conveyor frame 168 is mounted on the carriage 164 by means of suitable adjustable leveling bolts 169. With this arrangement, the conveyor frame 168 may be positioned as desired relative to both the belt conveyor 29 of the make-up unit 25 and the conveyor 148. The side rails of the conveyor frame 168 are suitably apertured to receive anhcoring means for securing the same to brackets 171 adjustably mounted upon the conveyor frame portions of the units with which the separator is to be employed.

As best seen in FIG. 4, angularly disposed and transversely extending guide plates 172 are provided with suitable end flanges secured to the side members of the conveyor frame 168. Formed as an extension of the guide plate 172 at the receiving end of the unit is a transversely extending guide bar or thin guide member 173, of substantially triangular cross section with a rounded outer edge, which is also secured in any suitable manner to the side members of the conveyor frame 168. Rotatably mounted adjacent the lower end of the other guide plate 172 is a knurled steel roller 174. As shown in FIG. 5, the ends of this roller 174 are journalled in bearing brackets 175 each of which is threadedly engaged by an adjusting bolt 176 extending through a suitable aperture in the conveyor frame 168. Extending across the central portion of the conveyor frame 168 adjacent the lower edge thereof are a pair of knurled steel rollers 177 which are journalled at their ends in suitable bearings 178 secured to the conveyor frame. A crepe rubber roller 179 disposed in close peripheral relationship to both of the steel rollers 177 is secured to a transverse shaft 181 which is mounted at its opposite ends in bearing blocks 182 slidably disposed in suitable vertical slots in the side portions of the conveyor frame 168 and threadedly engaging an adjustable compression bolt 183 extending downwardly through a tapped portion of the conveyor frame and having a lock nut 184 mounted thereon. An endless conveyor belt 185 extends across the two guide plates 172 around the guide bar 173 and roller 174 and up between the rollers 177 and the rubber drive roller 179 and over the upper portion of the latter. Movement of the upper run of this belt 185 is accomplished from right to left in FIGS. 4 and 5 by engagement of the drive chain 167 with a drive sprocket 186 (FIG. 5) rigidly secured to an outer end of the shaft 181.

A dough piece feed means in the form of a wire roller 187 is mounted in closely spaced relationship relative to the receiving end of the belt conveyor 185. The wire roller 187, as best seen in FIG. 5, comprises wire rods spaced peripherally around suitable mounting discs some of which are secured, as at 188, to a transverse roller driving shaft 189 that is journalled adjacent its ends in the lower ends of adjustable mounting arms 191. The upper ends of these arms 191 are secured to the outer ends of a transverse rod 192 that extends through suitable horizontally disposed slots 193 in the side members of the conveyor frame 168 (FIG. 4). The upper flange of each of the side members of the conveyor frame 168 also is provided with a slot 194 (FIG. 5) through which an adjusting bolt 195 extends that is threadedly engaged adjacent its lower end in a suitable tapped member rotatably secured on a horizontal axis to the associated mounting arm 191. With this arrangement, the position of the wire roller 187 may be accurately adjusted as desired, in both horizontal and vertical directions, relative to the receiving portion of the belt 185 passing around the thin edge of the guide bar 173. One end of the driving shaft 189 of the wire roller 187 has a drive sprocket 196 secured thereto (FIG. 5) which is driven from a sprocket 197, that is mounted upon the main drive shaft 181, by means of a suitable chain 198 (FIG. 2). The relationship of the several parts is such that the peripheral speed of the wire roller 187 is the same as the lineal speed of the conveyor belt 185.

In operation, the lower run of the belt 185 passing under the guide bar 173 is located in as close as possible relationship to the belt conveyor 29 without having a scraping contact therewith, and the separator unit 26 is secured in an angular relationship to the belt conveyor 29, as in the manner of FIG. 1, to effect the desired separation or spacing of adjacent dough pieces laterally of their direction of travel. As the conveyor belt 29 delivers each dough piece into engagement with the receiving edge of the separator conveyor means, the belt 185 and the wire roller 187 will remove that dough piece from the conveyor belt 29 and start it moving in a new direction, namely, that of the upper run of the belt 185. By virtue of the angular relationship between separator unit 26 and the conveyor 29, there will be a short time interval between the instant that the first dough piece at the left in a transverse row of dough pieces on the belt 29 is removed therefrom and the instant that the next adjacent dough piece to the right thereof is engaged by the belt 185 and the roller 187. Such time interval thus is transformed into a lateral spacing or separation of these two adjacent dough pieces laterally of, or normal to, their direction of travel.

At the same time, and this without regard to the relative angular disposition of the separator unit 26 and the supplying conveyor 29, the dough pieces will be spaced or separated from each other in the direction of their movement, because the belt 185 and the wire feed roller 187 are operated at a greater rate of speed than the supplying conveyor 29. In this respect, the wire roller 187 is of material advantage. This should be adjusted relative to the belt 185 in accordance with the vertical thickness of the dough pieces, since it should slightly depressingly engage the upper surfaces of the dough pieces. While this will temporarily deform those dough surfaces, any dough employed is of sufficiently resilient characteristics that it will almost immediately return to its original shape upon disengagement of the wire roller 187 therefrom.

It will be understood that the separator and transfer section 26 may equally well be employed with conveyors moving in substantially the same direction, in addition to the described arrangement wherein the make-up section 25 is disposed approximately at right angles to the conveyor means 148. And any desired angular placement of the separator unit 26 readily may be retained with the aid of the adjustable brackets 171. This, together with the arrangement for selectively adjusting the speed of travel of the belt 185, facilitates selection of any desired spacing within wide limits, as between 0 and 1½ inches, in either or both directions between adjacent dough pieces. When it is desired to separate or space dough pieces from each other laterally of their direction of travel only, the belts of the supplying conveyor 29 and 185 of the separator 26 will be driven at the same lineal speed. This is particularly useful where the dough pieces comprise strips and lateral spacing thereof is desired, and it will avoid stretching of the dough strips longitudinally, which would occur to long strips if the speed of belt 185 were greater than that of belt 29. And it will be readily apparent that lateral spacing of such long strips of dough may be varied as desired merely by adjusting the angular relationship between the conveyors 29 and 185.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. In food production equipment for use with dough piece make-up means having a conveyor for continuously delivering dough pieces in closely adjacent relative relationship, a separator for removing said dough pieces from said conveyor and spacing the same from each other, comprising conveyor means having a receiving end directly cooperating with a portion of said make-up conveyor and disposed above a horizontal plane through said portion of said make-up conveyor to remove and supportingly carry dough pieces from said make-up conveyor, and including an endless belt having one reach in a plane parallel to that of said make-up conveyor and another reach moving away from the latter for directly engaging said dough pieces while the same are on said make-up conveyor and removing said dough pieces therefrom; means for driving said conveyor means independently of and at a greater speed than said make-up conveyor; and means for supporting said conveyor means with the horizontal projection of a line defining the direction of travel thereof disposed angularly relative to the horizontal projection of a line defining the direction of travel of said make-up conveyor to effect additional spacing of adjacent said dough pieces laterally of their direction of travel.

2. A device of the class described for delivering dough pieces from a conveyor, on which they are disposed in contiguous relationship both in the direction of travel of the conveyor and laterally with respect thereto, to a dough piece receiving means, comprising a separator for spacing said dough pieces from each other both in their direction of travel and laterally thereof, including a guide member, an endless belt with upper and lower reaches passing over said guide member, means for mounting said guide member in a plane parallel to said conveyor above the same and disposed to position the horizontal projection of a line defining the direction of travel of said belt at an angle relative to the horizontal projection of a line defining the direction of travel of said conveyor to dispose the upper reach of said belt in position to remove the dough pieces from said conveyor and space the same from each other laterally of their direction of travel, and means for driving said belt at a greater speed than said conveyor to space said dough pieces from each other in their direction of travel; and a second conveyor for receiving the spaced dough pieces from said separator and delivering the same to the receiving means.

3. In combination with a conveyor carrying dough pieces thereon in contiguous relationship both in their direction of travel and laterally with respect thereto, a separator for spacing said dough pieces from each other in both such directions, comprising an endless belt with upper and lower reaches separated at one end by a thin guide member over which said belt runs to define a receiving end of the separator, means for supporting said guide member above said conveyor to dispose the horizontal projection of a line defining the direction of travel of said belt at an acute angle with respect to the horizontal projection of a line defining the direction of travel of the dough pieces on said conveyor to enable said upper reach to remove the dough pieces from said conveyor, and means for driving said belt at a lineal speed greater than that of said conveyor.

4. In a dough piece separator according to claim 3, dough piece feed means comprising a feed roller mounted in closely spaced and parallel relationship relative to said guide member, and means for imparting a peripheral speed to said feed roller substantially equal to the lineal speed of said belt.

5. A dough piece separator according to claim 3, wherein said conveyor has a stationary frame, and said supporting means includes a wheeled carriage, and bracket means for adjustably securing said separator to said stationary frame.

6. In combination with a conveyor carrying dough pieces in contiguous relationship both in their direction of travel and laterally with respect thereto, a separator for spacing said dough pieces from each other in both such directions, comprising an endless belt having upper and lower runs; guide means for guiding said belt, including a roller extending transversely of the belt to define a delivery end, a guide member extending transversely of the belt to define a receiving end, and frame members interposed between said roller and said plate for guiding said upper run; means for driving said belt at a lineal speed greater than that of said conveyor, comprising rollers disposed below said frame members and engaging said lower run for driving said belt without applying undue strain upon said roller and said plate; and means for supporting said guide means to dispose said receiving end of the separator above and in directly associated cooperative relationship relative to the conveyor with the horizontal projection of a line defining its direction of travel extending angularly laterally relative to the horizontal projection of a line defining the direction of travel of the conveyor.

7. In a dough piece separator according to claim 6, dough piece feed means comprising a feed roller mounted in closely spaced and parallel relationship relative to said guide member, and means for imparting a peripheral speed to said feed roller substantially equal to the lineal speed of said belt.

8. In combination with a conveyor carrying dough pieces thereon in contiguous relationship relative to each other, a separator for spacing said dough pieces from each other laterally of their direction of travel on said conveyor, comprising an endless belt with upper and lower reaches separated at one end by a thin guide member over which said belt runs to define a receiving end of the separator, means for supporting said guide member above and in a plane parallel to that of said conveyor and at an angle with respect to the direction of travel of the dough pieces on said conveyor in position for said upper reach to receive the dough pieces from said conveyor, means for driving said belt independently of said conveyor, dough piece feed means comprising a feed roller mounted in closely spaced and parallel relationship relative to said guide member, and means for imparting a peripheral speed to said feed roller substantially equal to the lineal speed of said belt.

9. A dough piece separator according to claim 8, wherein said conveyor has a stationary frame, and said supporting means includes a wheeled carriage, and bracket means for adjustably securing said separator to said stationary frame.

References Cited in the file of this patent

UNITED STATES PATENTS

| | | |
|---|---|---|
| 1,351,018 | Blando | Aug. 31, 1920 |
| 1,527,262 | Martin | Feb. 24, 1925 |
| 1,669,220 | Thropp | May 8, 1928 |
| 2,168,419 | Paterson | Aug. 8, 1939 |
| 2,371,877 | Crosland | Mar. 20, 1945 |
| 2,404,882 | Monaco | July 30, 1946 |
| 2,452,978 | Woldring | Nov. 2, 1948 |